(12) United States Patent
Kever

(10) Patent No.: US 6,735,673 B2
(45) Date of Patent: May 11, 2004

(54) APPARATUS AND METHODS FOR CACHE LINE COMPRESSION

(75) Inventor: Wayne Kever, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 10/043,789

(22) Filed: Jan. 10, 2002

(65) Prior Publication Data

US 2003/0131184 A1 Jul. 10, 2003

(51) Int. Cl.[7] .............................................. G06F 12/00
(52) U.S. Cl. ......................... 711/118; 709/247; 710/68
(58) Field of Search ................................ 711/118, 1, 3, 711/113, 122, 128, 133, 170, 129; 710/68; 382/232–233; 345/422, 501–509, 521, 555–557; 707/101; 709/247; 714/763–764

(56) References Cited

U.S. PATENT DOCUMENTS

| | | | | |
|---|---|---|---|---|
| 6,032,148 A | * | 2/2000 | Wilkes | 707/101 |
| 6,115,787 A | * | 9/2000 | Obara | 711/113 |
| 6,128,094 A | * | 10/2000 | Smith | 358/1.15 |
| 6,324,621 B2 | * | 11/2001 | Singh et al. | 711/129 |
| 6,484,228 B2 | * | 11/2002 | Breternitz et al. | 711/1 |
| 6,580,427 B1 | * | 6/2003 | Orenstein et al. | 345/422 |
| 6,581,131 B2 | * | 6/2003 | Vondran, Jr. | 711/3 |

* cited by examiner

Primary Examiner—Nasser Moazzami

(57) ABSTRACT

A method for storing lines of data in a data array of a cache memory mapped to a main memory of a processing system. The data array includes data storage lines having equal lengths. The method includes compressing at least one of the lines of data, fitting the compressed line of data within a subsection of one of the data storage lines, and pointing to the subsection using a tag array. When lines of data are stored in compressed form, more lines can fit into the cache, and a probability of a cache hit is increased.

18 Claims, 3 Drawing Sheets

APPARATUS AND METHODS FOR CACHE LINE COMPRESSION

FIELD OF THE INVENTION

The present invention relates generally to processing systems and, more particularly, to compression of lines of data in processing system cache memories.

BACKGROUND OF THE INVENTION

Cache memories typically are utilized in processing systems for speeding up processor access to data stored in a main memory. A cache memory is smaller, faster and typically more expensive than main memory. When a processor requests data that resides in main memory, the processing system transmits the requested data to the processor and also may store the data in a cache memory, of which there may be a plurality of levels. When the processor issues a subsequent request for the same data, the processing system first checks cache memory. If requested data resides in the cache, the system gets a cache "hit" and delivers the data to the processor from the cache. If the data is not resident in the cache, a cache "miss" occurs, and the system retrieves the data from main memory. Frequently utilized data thus is retrieved more rapidly than less frequently requested data, and overall data access latency, i.e. time between a request for data and delivery of the data, is reduced.

Intermediate levels of cache may be utilized between a primary cache and main memory and are typically slower, and less expensive, than the primary cache. Upper-level caches in such a cache hierarchy generally are arranged in order of decreasing speed and typically are used to hold data accessed less frequently than data kept in the primary cache. When a cache miss occurs at the primary cache level, the processing system checks the upper cache level(s) for the requested data before accessing the data from main memory. Thus, although utilizing upper levels of cache can tend to improve overall system performance, it nevertheless remains desirable to make the lowest level of cache as large as affordable, to improve the chances of a cache hit in the lowest level of cache.

When a data address is presented to a cache, a lookup in a cache tag array is performed to determine if the requested data is currently in a data array of the cache. If so, then the data array is read. Data is stored in a cache data array as "lines", all lines in the array containing equal numbers of bytes. The cache line size is generally the same for all levels of cache in a system. Current line sizes frequently are set at 64 or 128 bytes. A one-megabyte cache (having 2**20 bytes), for example, would store 8,192 128-byte lines, and a corresponding tag structure would contain 8192 entries. Increasing a cache size in a processing system not only can be expensive, but also can increase latency, as the processing system could be required to search a larger tag array, and then search a larger data array, to locate data in the cache.

Techniques are known which are aimed at reducing latency in cache searches. For example, data and tag lookup can be performed in parallel to reduce the number of clock cycles needed to search a cache. It also would be desirable, however, to increase the storage capacity of a cache without having to increase its physical size. Thus it would be desirable to provide for data compression in a cache. Such compression would be particularly appropriate for lower levels of a cache hierarchy, where capacity, more than latency, can affect system performance.

SUMMARY OF THE INVENTION

In one preferred form, the present invention is directed to a method for storing lines of data in a data array of a cache memory mapped to a main memory of a processing system. The data array includes a plurality of data storage lines having equal lengths. The method includes steps of compressing at least one of the lines of data, fitting the compressed line of data within a subsection of one of the data storage lines, and pointing to the subsection using a tag array.

When lines of data are compressed on writes to cache and decompressed on reads from cache, more lines can fit into the cache. Thus a probability of a cache hit is increased, and processing system performance is enhanced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses. Although the present invention is described herein with reference to set-associative cache, the invention is not so limited. Embodiments of the invention can be practiced in connection with other forms of cache mapping, including but not limited to direct and associative cache mapping. Additionally, although embodiments are described herein with respect to two-way set-associative cache, the invention can be practiced with higher levels of set associativity.

Figure 1:
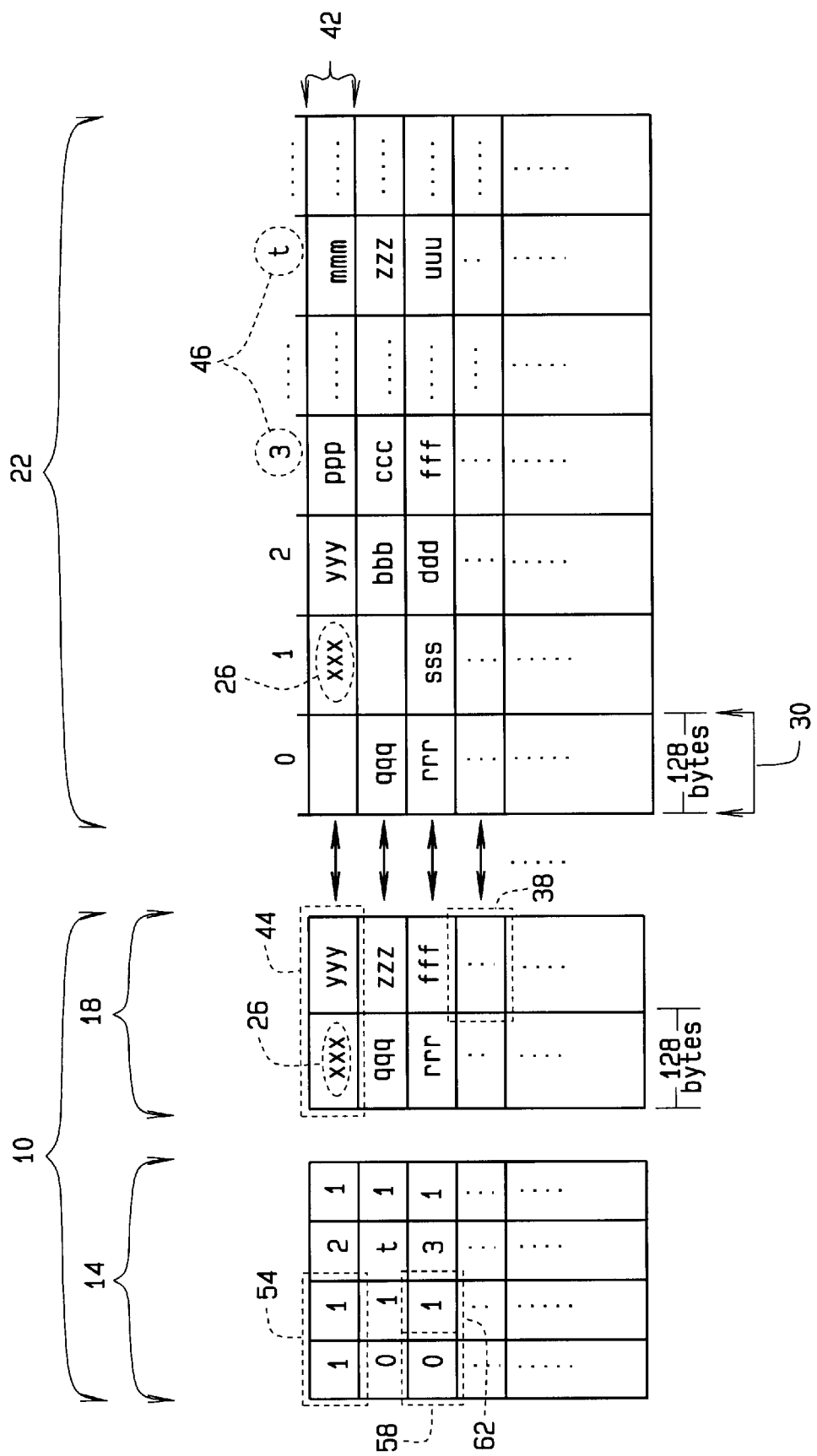
FIG. 1 is a simplified diagram of a two-way set-associative cache of the prior art.

A two-way set-associative cache of the prior art is indicated generally by reference number 10 in FIG. 1. The cache 10 includes a tag array 14 that maps a data array 18 onto a main memory 22. Lines 26 of data are stored in the main memory 22 and are aligned on cache line boundaries 30, such that the lines of data 26 are equal in length to data storage lines 38 in the cache data array 18. For many processing systems, a line of data is commonly 64 or 128 bytes. As shown in FIG. 1, the lines of data 26 and the data storage lines 38 are 128 bytes in length.

Each address for a line of data 26 in main memory 22 includes a tag reference 46. Additionally, the main memory 22 can be considered to be divided into a plurality of groups 42, each of which is associated with a set 44 of two data storage lines 38 in the data array 18. For every data storage line 38 in the cache data array 18, the tag array 14 includes a corresponding element 54. As used herein, the term "element" is defined as a location (which may or may not be occupied by valid data) within an array. Each element 54 of the tag array 14 includes a tag entry 58 and a "valid" bit 62.

When a line of data 26 is written to the cache 10, it is written into one of the data storage lines 38 in the set 44 associated with the group 42 of the main memory 22 from which the line of data 26 is being written. A particular data storage line 38 can be selected based on (among other possible criteria) whether the "valid" bits of the two data storage lines 38 in the associated set 44 indicate the presence of valid data, i.e. another line of data 26 from the associated group 42 in the main memory 22. When a line of data 26 is written into a data storage line 38, the tag 46 referencing the line of data 26 in main memory 22 is written into the corresponding tag entry 58 of the tag array 14. The corresponding "valid" bit 62 also is updated to indicate that the data storage line 38 into which the line of data 26 is written contains valid data.

Conventional caches typically include a tag for every data storage line, and thus for every line of data, in the cache. Referring to the simplified cache 10 shown in FIG. 1, it can be seen that where the cache 10 is a one-megabyte cache, the data array 18 can hold 8,192 lines of 128 bytes. For every data storage line 38 in the data array 18, a corresponding tag array element 54 is needed. The corresponding tag array 14 thus would have 8,192 tag array elements 54.

It would be desirable to increase the storage capacity of a cache data array by storing compressed lines of data in the array. As used herein, the term "compression ratio" is defined as a ratio of a compressed size of a line of data to an uncompressed size of the line of data. Thus, for example, where a 128-byte line of data compresses to 64 bytes, the compression ratio is 0.5.

Data compression tends to be data pattern dependent. When data compression is performed, it typically is not known beforehand what compression ratio will be obtained. On the other hand, in a cache, one tag entry is provided for each line of data being stored in the cache, and the tag entries are fixed in number. That is, the number of available tags is predetermined by a size of a tag array used to reference the cache data array. If data were to be stored in compressed form in a cache data array, a tag structure for such a cache would include enough entries to represent all lines of data that might be present in the data array. For example, if two or fewer lines of data could be packed into a data storage line that would fit one uncompressed line of data, a tag structure would need twice as many entries as would be needed for a cache with no compression. Thus if as much as two megabytes of lines of data were stored as compressed lines, 16,384 tags would be used to keep track of the lines of data.

An embodiment of the present invention is directed to a method for storing lines of data in a cache data array. This method includes compressing at least one of the lines of data, fitting the compressed line of data within a subsection of one of the data storage lines in the array, and pointing to the subsection using a tag array. If a line of data is compressed to a compression ratio greater than a predetermined limit, then the uncompressed line of data is inserted into the cache.

For example, and as shall be further described in connection with FIG. 2, if a compression ratio is less than or equal to 0.5 for a compressed line of data, the compressed line of data is written into one half of a data storage line. The other half of the half-filled data storage line is available for another compressed line of data. When an uncompressed line of data is written to the cache, one of two tag entries for that data storage line is used to reference the line of data. The other entry is not used and thus is invalid when uncompressed data is held in the data storage line.

Figure 2:
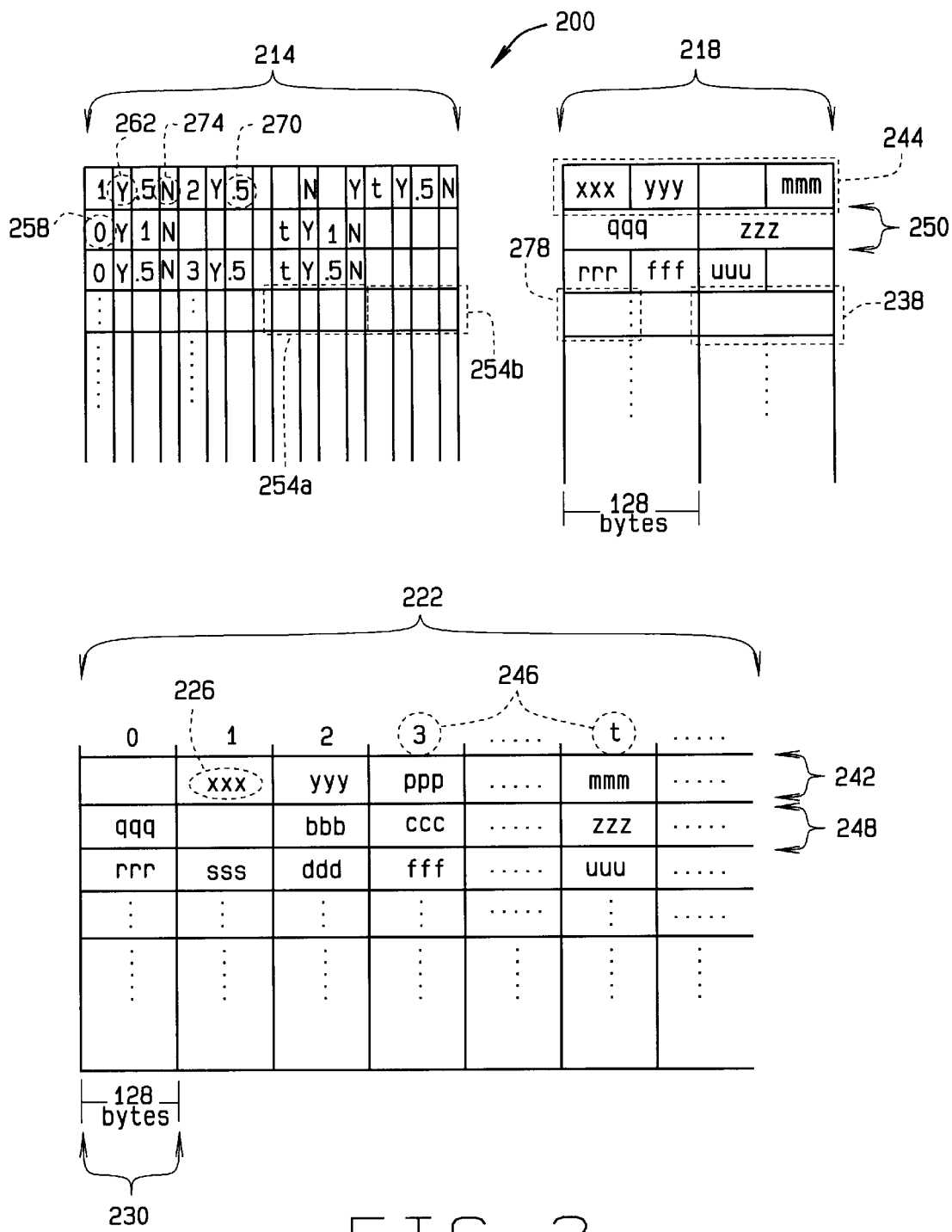
FIG. 2 is a simplified diagram of a two-way set-associative cache according to one embodiment of the present invention.

A two-way set-associative cache according to one embodiment of the present invention is indicated generally by reference number 200 in FIG. 2. The cache 200 includes a tag array 214 that maps a data array 218, for example, onto a main memory 222. Lines 226 of data are stored in the main memory 222 and are aligned on cache line boundaries 230, such that the lines of data 226 are equal in length to data storage lines 238 in the cache data array 218. As shown in FIG. 2, the lines of data 226 and the data storage lines 238 are 128 bytes in length. Although the present embodiment is described in connection with lines of data 128 bytes long, it is contemplated that the invention can be practiced in connection with other line lengths.

Each address for a line of data 226 in main memory 222 includes a tag reference 246. Additionally, the main memory 222 can be considered to be divided into a plurality of groups 242, each of which is associated with a set 244 of two data storage lines 238 in the data array 218. For example, a main memory group 248 is associated with a set 250 in the data array 218.

A set of possible data storage line subsection lengths available for storing lines of data is predefined for the data array 218. Specifically, it is predefined that a line of data 226 could be stored either in one-half of a data storage line 238 or in an entire data storage line 238. The tag array 214 includes an element 254 for each of the smallest possible subsections, i.e. for each half-storage line 278. Thus, for each data storage line 238 in the cache data array 218, the tag array 214 includes two corresponding elements 254a and 254b. It should be noted that alternative and additional subsection predefinitions are possible. For example, one-quarter and three-quarter subsections of data storage lines 238 could also be predefined. In such case the tag array 214 would include four corresponding elements 254 for each data storage line 238.

Referring again to FIG. 2, each element 254 includes a tag entry 258, a "valid" bit 262, a compression indicator 270 and an "available" field 274. The valid bit 262 is set for each subsection 278 of the data storage line 238 that may contain a valid line of data 226. The "available" field 274 is used to indicate whether a corresponding data storage line subsection 278 holds a compressed line of data 226, or instead is occupied by an uncompressed line of data 226 that occupies more than one subsection 278. Additionally, the "available" field 274 is used to indicate whether the corresponding subsection 278 is presently available or is in use by another tag entry.

The compression indicator 270 is used to indicate a compression status for a line of data 226 stored in the corresponding subsection 278. For example, the indicator 270 is used to indicate whether or not the corresponding line of data 226 is compressed, and, in an embodiment in which a plurality of compression ratios are accommodated, a compression ratio for the stored line of data 226. The compression indicator 270 also is used by decompression hardware (not shown) when the line of data is read from the cache 200.

Figure 3:
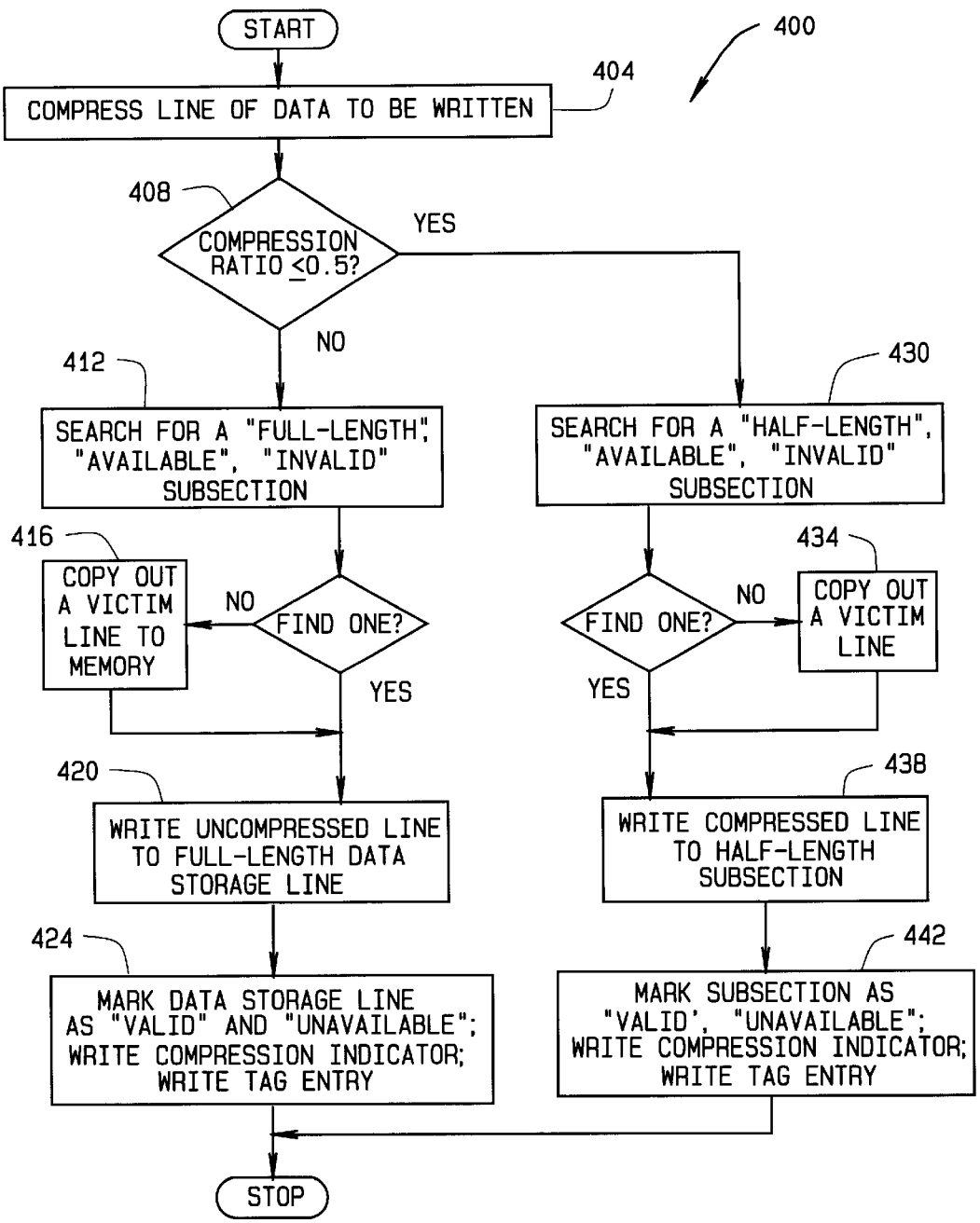
FIG. 3 is a flowchart of a method for storing data in a cache memory according to one embodiment of the present invention.

Lines of data may be stored in the cache 200 using a method indicated generally in FIG. 3 by reference number 400. A line of data 226 to be written is compressed at a step 404. The compression ratio for the compressed line of data 226 is checked at a step 408. If the compression ratio is greater than 0.5, a search is performed, at a step 412, for an entire data storage line 238 in which to store the line of data 226 in uncompressed form. A tag array element 254 is searched for that is marked "invalid" and "available" per indicators 262 and 274.

If such an element 254 is not found, a "victim" line of data 226 is selected for replacement, at a step 416. The victim line 226 is copied to the main memory 222. Copying out as a victim all lines of data 226 within a data storage line 238 serves to reclaim all the tag array elements 254 associated with that data storage line 238, thus creating two invalid and available tag elements 254 in the set 244. The new line 226 is inserted in place of the victim. The uncompressed line 226 is written, at a step 420, into the selected subsection, i.e. the entire data storage line 238. At a step 424, the entire data storage line 238 is marked as "valid" and "unavailable" per indicators 262 and 274. The compression indicator is 270 is written to indicate that the line of data is not compressed, and the tag entry 258 is updated to point to the written data storage line 238.

If the compression ratio is less than or equal to 0.5, a search is performed, at a step 430, for a tag array element 254 pointing to a half-length data storage line 238 subsection in the associated set 244 which is both invalid and available. If no such tag array element 254 is found, a victim line of data 226 is selected at a step 434 and written to the memory 222. The compressed line 226 is written, at a step 438, into the selected half-length subsection 278. At a step 442, the half-length subsection 278 is marked as "valid" and "unavailable" per indicators 262 and 274. The compression indicator is 270 is written to indicate that the line of data 226 is compressed, and the tag entry 258 is updated to point to the written half-length subsection 278. It should be noted that comparisons to alternative and additional compression ratios may be made, particularly in embodiments wherein other sets of subsections 278 are predefined as previously described.

Lines of data 226 can be compressed using compression algorithms known in the art. Such algorithms typically, but not necessarily, are implemented in hardware. Possible algorithms and compression/decompression hardware include, but are not limited to, run length coding methods, in which repeated bits are compressed, and Huffman coding. Several compression methods are described in U.S. Pat. Nos. 5,389,922 and 5,488,365 issued to Seroussi et al. and assigned to the assignee hereof, the disclosures of which are incorporated herein by reference in their entirety.

Symbol dictionary-based compression methods can be used, wherein a dictionary and a compressed result are stored in a data array entry. Alternatively, a separate storage is used for the dictionary. If separate dictionary storage is used, an algorithm is established for dictionary updates, for example based on observing an achieved level of compression performance and updating the dictionary when performance falls below a threshold. To change a symbol table, all lines compressed with an old table are read out and written back after compression with a new table.

Compression performance can be monitored as follows. If performance falls below a threshold, the cache can be flushed to main memory. The dictionary then is considered invalid. The cache is then re-filled with demand fetches from memory. A compression algorithm can be used to automatically build up a new dictionary as data is fed through it.

Referring to FIG. 2, the number of tag array elements 254 is related to a maximum compression allowed in the cache 200. For example, if a compression ratio of 0.5 or 0.25 is allowed, four times as many elements 254 would be used as for storing an uncompressed data array in the cache 200. In embodiments in which up to four lines of compressed data could be compressed into one data storage line 238, lines of data 226 could occupy 0.25, 0.5, or 0.75 of a data storage line 238. Thus when a line of data 226 compressed to 0.75 of uncompressed size is stored in a data storage line 238, if a line 226 compressed to 0.25 of uncompressed size subsequently is to be inserted into the same set 244 of the cache 200, it can be placed in the remaining available bytes of that data storage line 238.

Although the above methods for storing data lines in a cache are not limited to use with set-associative caches, they are highly effective when implemented in caches having a high degree of set associativity. When a cache is structured and data lines are compressed as described above, additional storage space can be made available within a cache data array, thus increasing chances for a cache hit and improving processing system performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for storing lines of data in a data array of a cache memory mapped to a main memory of a processing system, the data array including a plurality of data storage lines having equal lengths, the method comprising:
   compressing at least one of the lines of data;
   determining a compression ratio for the at least one line of data compressed;
   fitting the compressed line of data within a subsection of one of the data storage lines whenever the compression ratio does not exceed a predetermined compression ratio limit;
   storing the compressed line of data in uncompressed form in an entire one of the data storage lines whenever the compression ratio exceeds the predetermined compression ratio limit; and
   pointing to the compressed or uncompressed data using a tag array.

2. The method of claim 1 wherein the fitting the compressed line of data within a subsection comprises:
   predefining a plurality of possible subsection lengths available for storing lines of data within each data storage line; and
   fitting the compressed line of data within a subsection having one of the predefined lengths.

3. The method of claim 1 wherein the pointing to the compressed or uncompressed data using a tag array comprises allocating an element in the tag array to each of the subsections.

4. The method of claim 3 wherein the allocating an element in the tag array comprises casting out a victim line from the cache based on a compression indicator.

5. The method of claim 1 further comprising decompressing the compressed line of data when reading from the cache memory data array.

6. The method of claim 1 wherein the pointing to the subsection using a tag array comprises configuring the tag and data arrays to correspond to lines of data within groups of the main memory.

7. In a processing system, a cache for holding lines of data retrieved from a main memory of the processing system, the cache comprising:

a data array mapped to the main memory, the data array comprising a plurality of data storage lines for storing the lines of data, each data storage line configured to hold a plurality of compressed lines of data; and a tag array configured to point to lines of data stored in the data array, the tag array comprising an element for every line of data that may be stored in the data array, the element including a compression indicator indicating a compression ratio for a compressed line of data.

8. The cache of claim 7 wherein each of the data storage lines comprises a plurality of possible subsections in which a line of data may be stored, each of the tag elements corresponding to a corresponding possible subsection.

9. The cache of claim 7 wherein the tag array comprises an element for every subsection of a data storage line in which a line of data may be stored.

10. The cache of claim 7 wherein each of the tag elements comprises an available indicator configured to indicate whether a data storage line subsection is available for holding a data storage line.

11. The cache of claim 7 wherein the data array comprises a plurality of sets, each of the sets corresponding to one of a plurality of groups of the main memory.

12. The cache of claim 7 further comprising a symbol dictionary configured to be referenced during compression of a line of data.

13. The cache of claim 7 wherein each of the data storage lines is configured to hold an uncompressed line of data in more than one subsection.

14. In a processing system, a cache for holding lines of data retrieved from a main memory of the processing system, the cache comprising:

a data array mapped to the main memory, the data array comprising a plurality of data storage lines for storing the lines of data, each data storage line configured to hold up to and including two compressed lines of data; and a tag array configured to point to lines of data stored in the data array, the tag array comprising two elements for every data storage line, each tag array element including an indicator for indicating a compression ratio for a compressed line of data.

15. The cache of claim 1 wherein each of the data storage lines comprises two possible subsections in which a line of data may be stored, each of the tag elements corresponding to a corresponding possible subsection.

16. The cache of claim 14 wherein each of the data storage lines is configured to hold one uncompressed line of data.

17. The cache of claim 14 wherein each of the tag elements comprises an available indicator configured to indicate whether a data storage line subsection is available for holding a data storage line.

18. The cache of claim 14 further comprising a symbol dictionary configured to be referenced during compression of a line of data.

* * * * *